(12) United States Patent
Khusid et al.

(10) Patent No.: US 6,516,105 B1
(45) Date of Patent: Feb. 4, 2003

(54) OPTICAL BACKPLANE ASSEMBLY AND METHOD OF MAKING SAME

(75) Inventors: Michael Khusid, Cambridge, MA (US); Sepehr Kiani, Watertown, MA (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/685,537

(22) Filed: Oct. 10, 2000

(51) Int. Cl.[7] ............... G02B 6/26; G02B 6/42
(52) U.S. Cl. .................................................. 385/15
(58) Field of Search ....................... 385/15, 31, 18, 385/47

(56) References Cited

U.S. PATENT DOCUMENTS

| | | | | |
|---|---|---|---|---|
| RE31,832 E | * | 2/1985 | Samulski | .......... 374/131 |
| 4,505,539 A | * | 3/1985 | Auracher et al. | ........ 350/96.15 |
| 6,142,678 A | * | 11/2000 | Cheng | ............... 385/79 |

* cited by examiner

Primary Examiner—Javaid Nasri
(74) Attorney, Agent, or Firm—Teradyne Legal Dept.

(57) ABSTRACT

An optical backplane assembly made from a backplane and daughter cards attached to the backplane. The backplane includes optical vias coupled to optical signal traces in the backplane. Reflective elements are positioned in the vias to direct the optical signals to optical traces on the daughter cards. The required precision to position the reflective elements is achieved by determining the centers of the optical signal traces. Light emitting elements within the backplane are used to determine the locations of the optical signal traces.

17 Claims, 4 Drawing Sheets

OPTICAL BACKPLANE ASSEMBLY AND METHOD OF MAKING SAME

FIELD OF THE INVENTION

This invention relates generally to opto-electronics and more specifically to interconnection of opto-electronic components.

BACKGROUND OF THE INVENTION

Traditional high speed computer and communications systems are often built using a backplane assembly. The system is built on several printed circuit boards, called "daughter boards", that are interconnected through a backplane.

A traditional backplane is a printed circuit board that has many signal traces running through it. The traces route signals between connectors mounted on a surface of the backplane. The daughter cards have mating connectors along one edge, allowing each daughter card to be plugged into the backplane. In this configuration, the daughter cards are parallel to each other and mounted at right angles to the backplane.

There are several advantages to a backplane assembly in which daughter cards are mounted at right angles to the backplane using connectors. For example, the daughter cards can be easily accessed and removed from the assembly. As a result, such systems can be easily assembled. And, a daughter card can be easily removed and replaced, to make repairs to the system or to upgrade the system.

More recently, electronic systems have needed to transmit more data than could be reliably transmitted in electrical form. Some high speed systems are now being built with transmission paths that represent signals using light beams. Data can be transmitted at a very high rate using light beams. Instead of metal traces, such systems use optical fiber or waveguides built into circuit boards to transmit the light.

To connect boards in a right angle, a fiber bundle is typically used. The fiber is bent into a right angle. However, there are several drawbacks to using fiber bundles to connect boards at a right angle to create a backplane assembly. One difficulty is that fiber has a limited bend radius. Consequently, extra space is taken up by the fibers. In addition, having fibers running between boards creates a potential failure point and therefore the reliability of the system is decreased.

SUMMARY OF THE INVENTION

With the foregoing background in mind, it is an object of the invention to provide an electro-optical assembly that is easily manufactured and reliable.

The foregoing and other objects are achieved through the use of a substrate carrying a waveguide to a via hole. A reflector is positioned in the hole to redirect a light beam traveling through the waveguide to the desired direction.

The substrate is manufactured by positioning the reflector in a hole and adjusting its position based on amount of light transmitted through it. In a preferred embodiment, the light used to position the reflector is generated internal to the substrate, such as by a phosphorescent material.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
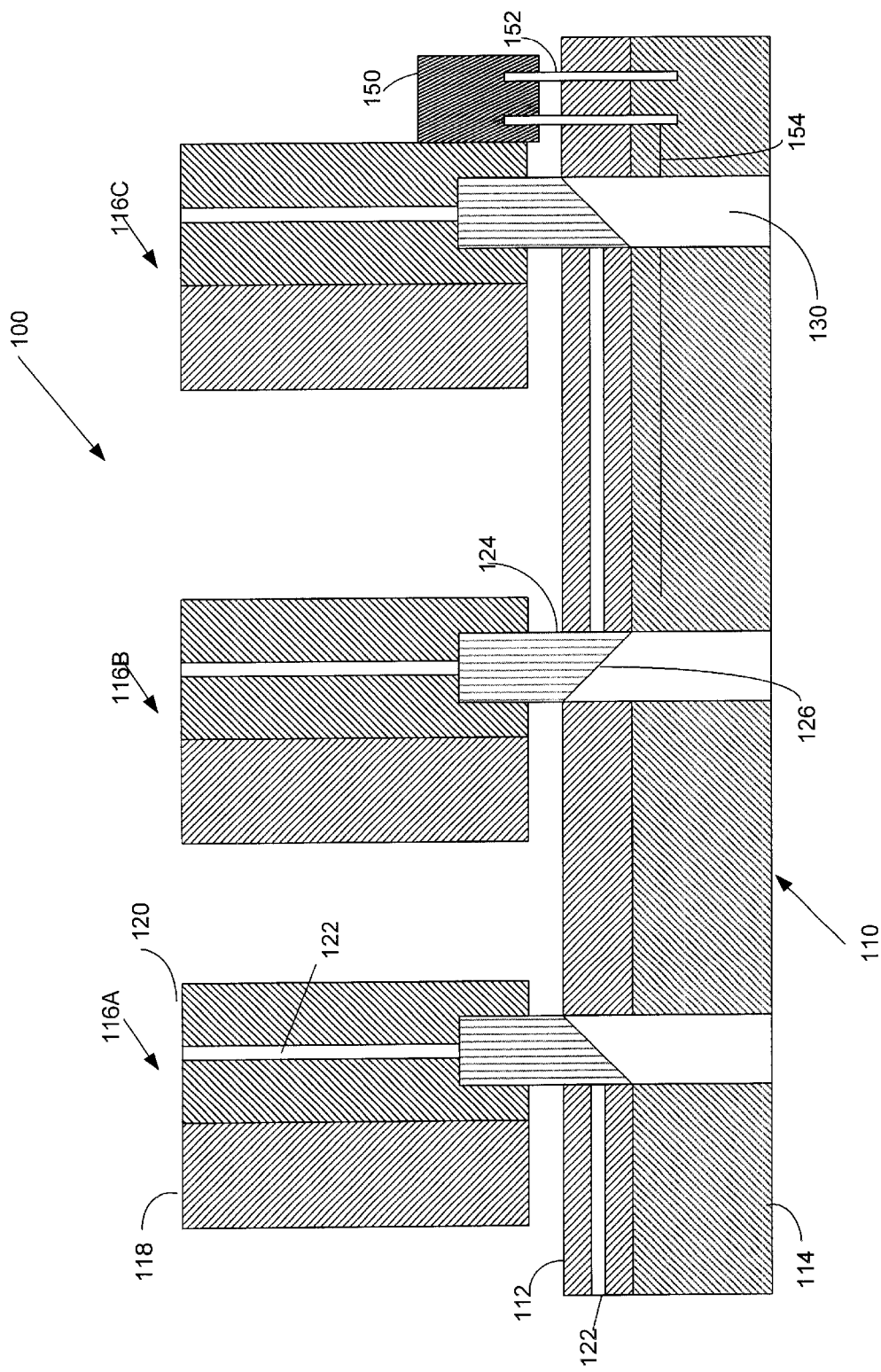
FIG. 1 is a sketch showing a backplane assembly using the invention.

FIG. 1 shows a side, cross sectional view of an optical backplane assembly 100. In the illustrated embodiment, the backplane assembly is a right angle backplane assembly. The assembly includes a backplane 110 and a plurality of daughter cards 116A . . . 116C, which are mounted at right angles to the backplane 110. Components found in traditional backplane assemblies, such as a supporting rack, are not shown for simplicity.

In the illustrated embodiment, backplane 110 includes a lower layer 114. Lower layer 114 could be a traditional printed circuit board carrying electrical signals, as in a conventional backplane assembly. For simplicity, electrical interconnections are not shown.

Backplane 110 also includes an upper layer 112. Upper layer 112 acts as a substrate to hold optical traces 122. As used herein, an optical trace is a structure that channels light, such that information encoded in the light can be conveyed from place to place. In the illustrated embodiment, planar waveguides are used to create optical traces. Such waveguides are known in the art and can be formed using known processes, such as for example polymer waveguides as constructed by Polymer Photonics, of Kennet Square, PA USA. Briefly, a polymer waveguide can be created from a polymer sheet acting as a matrix for high mobility monomers. Photolithographic techniques are used to selectively expose the areas of the sheet where the waveguide is to be formed, causing diffusion of the monomers and forming a region of sheet with a different index of refraction. The polymer is cured, locking the monomers in place, with the boundaries between the regions of different indices of refraction forming the walls of the waveguide. The entire sheet can then be laminated with other materials to provide mechanical support. However, any structure in which there is channel of material with a different refractive index from its surrounding could form an optical trace. For example, optical fiber can be used to form an optical trace as well.

Optical traces 122 run parallel with the upper surface of backplane 110. In a right angle backplane assembly, the light traveling through optical traces 122 must be turned at a right angle in order to couple signals to daughter boards 116A . . . 116C.

FIG. 1 shows a plurality of holes 130 in backplane 110. Holes 130 are optical via holes and connect to optical traces 122. Holes 130 are drilled, honed and polished to allow light traveling through an optical trace 122 to enter the hole with minimal scattering or loss.

Angle elements 124 are inserted into holes 130. Angle elements 124 bend the light entering an optical via hole 130 from an optical trace 122 on backplane 110 to align with an optical trace 122 on one of the daughter cards 116A . . . 116C. Because the light carrying elements will propagate light in either direction, light traveling from a daughter card optical trace will also be directed to a backplane trace.

Angle elements 124 are in a preferred embodiment a waveguide made of material with the same index of refraction as the optical traces 122. To bend light, the waveguide has an angled surface 126 that is reflective. Surface 126 is angled relative to the direction light travels in the optical trace 122. A reflective coating, such as metal, could be deposited on the surface to form a conventional mirror, though a reflective surface can be created without any coating if the index of refraction is sufficiently different between the materials on opposite sides of the surface. More preferably, an angled reflective surface that is less lossy than a metallized mirror is used. The mirror might be formed from a prism, from a structure called a "photonic band gap" (PBG) mirror or from a dielectric mirror. Herein, the structure that reflects light at an angle will be referred to generally as a mirror, regardless of the specific construction used to create it.

It should be appreciated that the figures depict the mirror as a flat surface. It is not required that the surface be flat. In some instances, it might be preferable to provide an angles surface 126 that is curved to better focus the light into the optical traces, thereby reducing the signal loss at the interface.

Daughter cards 116A . . . 116C are similar in construction to backplane 110. They contain a lower layer 118 that contains electrical traces and an upper layer 120 that acts as a substrate for optical traces 122. However, waveguide 124 makes a straight connection to optical traces 122 on the daughter cards 116A . . . 116C. Such connections are known in the art and the precise mechanism for making connection is not important to the invention. Preferably, the connection between waveguide 124 and optical traces 122 in the daughter cards is separable, meaning that daughter cards 116A . . . 116C can be easily removed from backplane assembly 100 and replaced.

It is desirable that the light carrying signals pass between daughter cards 116A . . . 116C and backplane 110 with little loss. To provide a low loss connection, it is desirable that mirror 126 be precisely aligned with optical traces 122 on the backplane and the daughter card. More specifically the optical centers of the optical traces must be aligned with the mirror. Optical center refers to the location of the center of the beam of light passing through the optical trace. The optical trace and the physical center of the trace might be different, making it difficult to know the physical position of angle element 124 that will maximize transmission of light between the backplane and the daughter cards. In addition, the tolerance on the alignment will preferably be on the order of a fractions of a micron, which is a tighter tolerance than can be achieved with traditional manufacturing techniques.

Figure 2:
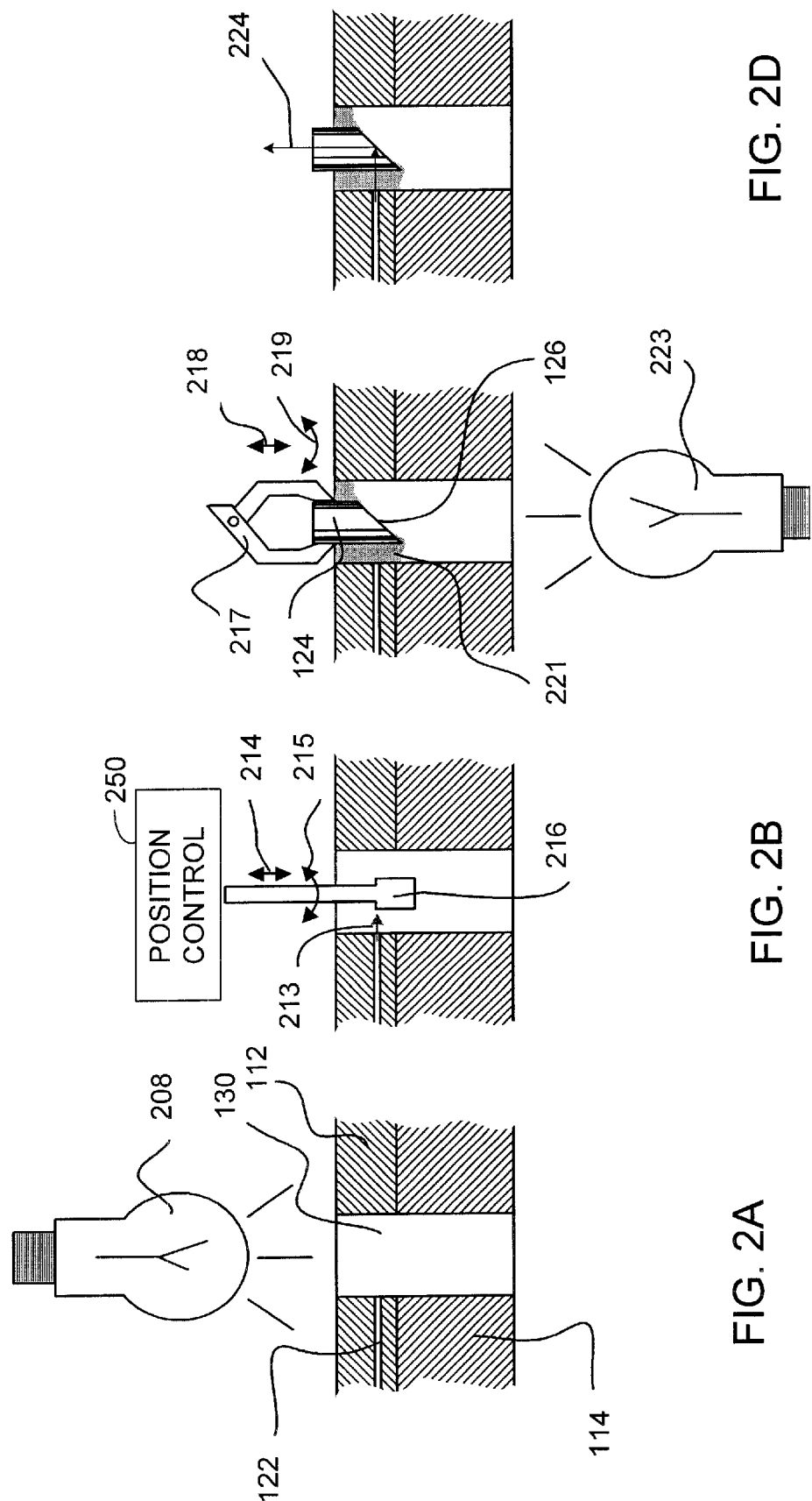
FIGS. 2A–2D are sketches showing steps in the manufacturing process of the backplane assembly in FIG. 1.

Turning to FIG. 2, a method of positioning angle element 124 is described. As will be described in greater detail in conjunction with FIG. 3, backplane 110 will be made with a material that can be made to emit light. In the preferred embodiment, a phosphorescent material is used. Phosphorescent material emits light for a period of time after it has been illuminated with light of a particular wavelength that excites the material. The emitted light is usually not of the same wavelength as the exciting light. To avoid interference with data communications when the backplane is in use, the phosphorescent material preferably is selected so as to not overlap with the wavelength of the light used to carry information when the backplane is in use. Wavelength separation can be achieved by choosing a phosphorescent material that is not excited by the frequency of light used to carry information. Alternatively, wavelength separation can be achieved by a material that emits light at a wavelength that is sufficiently different from the wavelength used to carry information that detectors used to detect information are not triggered by the light emitted by the phosphorescent material.

FIG. 2A shows that the first step in the process is to illuminate backplane 110 with a light source 208. Light source 208 has a frequency that excites the phosphorescent material.

The next step is shown in FIG. 2B. A light signal 213 generated by the phosphorescent material is shown exiting optical trace 122 into optical via hole 130. Directional scanning sensor 216 is lowered into an optical via hole 130 by position control unit 250. Directional scanning sensor 216 has an electrical signal output that has a level proportional to light impinging on the detector from a certain direction. As the orientation of directional scanning sensor 216, the output will change in proportion to the amount of light impinging from the direction in which the sensor is pointing. A directional scanning sensor can be constructed using known techniques. For example, a photo diode detector with a small aperture can serve as a suitable sensor. Position control unit 250 is a positioning apparatus of the type found in many precision machines. It can adjust the position of directional scanning sensor 216 with multiple degrees of freedom. In FIG. 2B, motion in directions 214 and 215 is illustrated. Position control unit 250 is integrated with the signal output of directional scanning sensor 216. Position control unit 250 moves directional scanning sensor until the output of sensor 216 is maximized, indicating that the sensor 216 is aligned with the optical center of optical trace 122. Control circuits and algorithms to optimize a signal output are well known in the art. Position control 250 can thus determine the optical center of the optical trace 122.

The next step is shown in FIG. 2C. Apparatus to hold angled element 124 are shown. Here a gripper 217 is shown, but many other suitable apparatus are known. For example, a vacuum pick-up assembly might be used. Regardless, the apparatus is coupled to position control 250. Position control 250 moves the angled element until reflective surface 126 of angled element 124 is positioned at the optical center of the optical trace 122 as measured by the sensor. Angled element 124 is then fixed in this position.

In the preferred embodiment, an adhesive material is used to secure angled element 124 in position. In a preferred embodiment, resin 221 is used to secure angled element. The resin is preferably an epoxy that can be activated for quick curing. In the illustrated embodiment, resin 221 is a UV curable epoxy. Light source 223 is a UV light source that is turned on to quickly cure resin 221 once angled element 124 is in position. Resin for use with optical components is known in the art. Preferably, the index of refraction of the resin when cured matches the index of refraction of the optical signal traces 122 to reduce optical signal loss.

Figure 3:
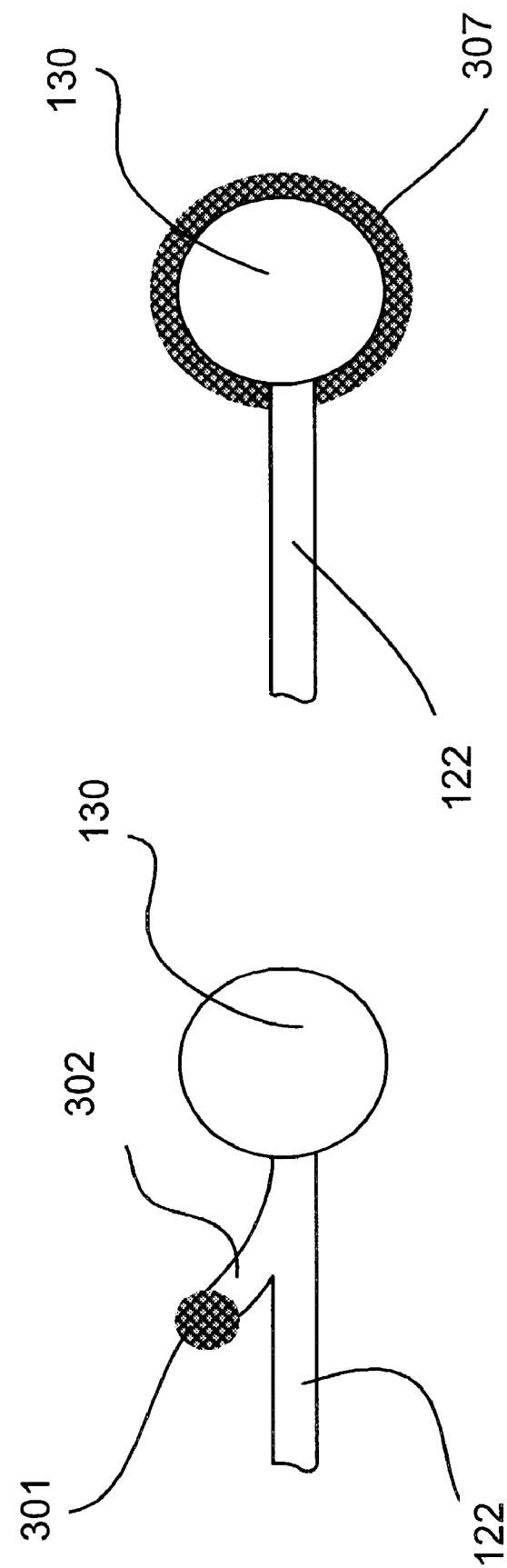
FIGS. 3A–3B are sketches showing a preferred embodiment of generating the light for positioning the reflective element in FIG. 2.

Turning to FIG. 3, details of the placement of the phosphorescent material used as a light source are shown. FIG. 3A illustrates one embodiment. Attached to optical signal trace 122 is a signal trace branch 302. Signal trace branch 302 is connected to optical signal trace 122 running to optical via hole 130.

Phosphorescent material 301 is positioned at the end of signal trace branch 302. It is deposited within upper layer 112 so that it is planar with optical signal trace 122. Phosphorescent material is sufficiently close to the surface of the backplane that light from source 208 will reach the material and activate it. Light emitted from phosphorescent material 301 will therefore travel down signal trace branch 302 to optical signal trace 122. The light will then travel down optical signal trace 122 to via hole 130, entering the via hole at the optical center of optical signal trace 122.

FIG. 3B shows an alternative embodiment. In FIG. 3B, phosphorescent material 307 is deposited around optical via hole 130. In this embodiment, no phosphorescent material appears over the physical opening of optical trace 122. When scanning sensor 216 is aligned with the physical opening of optical trace 122, the amount of light picked up by the sensor will be at a minimum. Thus, by manipulating the sensor 216 to minimize the measured light, the center of the optical trace can be found. When the optical and physical centers of the trace are nearly coincident, detecting the center of the optical trace in this fashion will be suitably accurate to allow light to pass through the angled element 124 without unacceptable attenuation.

Figure 4:
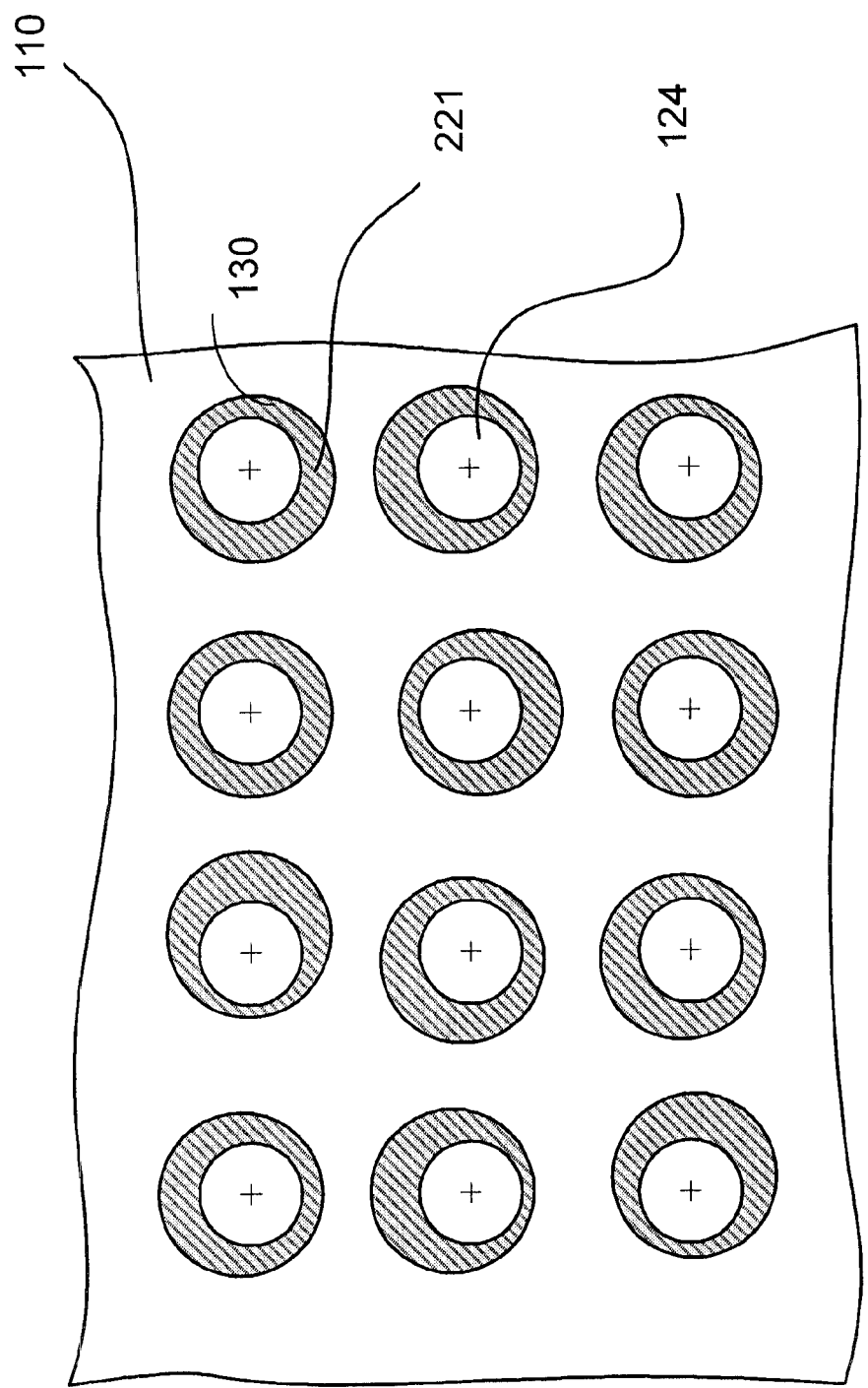
FIG. 4 is a sketch illustrating a top view of an array connector.

It is contemplated that the angled coupling of the invention will be used in a backplane assembly. FIG. 1 shows the backplane assembly in cross section. FIG. 4 shows a top view of a portion of the backplane 110. It is possible that multiple optical signal traces will be used to transmit signals from a daughter card to a backplane. Further, there might be multiple layers, such as 112 carrying optical traces. Thus, there will be an array of optical vias 130 used to interconnect each daughter card 116 to a backplane 110. FIG. 4 shows a top view of such an array.

In this view, it can be more clearly observed that each of the holes 130 is larger in diameter than the angled elements 124. These dimensions allow the angled elements to be moved around within the via hole 130 to achieve the required alignment. The remaining space in the hole is filled with the resin to secure the angled element 124 in the appropriate location.

Having described one embodiment, numerous alternative embodiments or variations might be made. For example, it was described that the optical printed circuit boards according to the invention are made with a phosphorescent material to emit light for aligning angled element 124. Other light emitting elements might be used. For example, materials that emits light when exposed to X-rays, might be used instead. Electrical elements, such as laser diodes, might also be used as light emitting elements.

As another example, it was described that the optical center of an optical trace was first measured and then a reflective element was positioned in that optical center. Alternatively, a scanning sensor could be connected to the daughter card end of the angled element 124. Angled element would then be moved until the output of the sensor reached a peak. The angled element would then be locked into that position.

Also, it should be appreciated that the foregoing has described the optical interconnections of the backplane assembly. It is possible that electrical interconnects will be used in conjunction with the optical interconnects. FIG. 1 illustrates a conventional electrical connector 150 attached to daughter card 116C. It mates with connecting elements 152 in the backplane 110, thereby making connection to electrical signal traces 154 in the backplane. Conventional connectors and construction techniques can be used for the electrical interconnects. For example, layers 114 and 118 could be conventional printed circuit boards, including layers of metal traces to carry electrical signals.

Also, it is described that a resin is used to hold the angled element in position. Any suitable potting material can be used, such as an index matching gel.

Therefore, the invention should be limited only by the spirit and scope of the appended claims.

What is claimed is:

1. An optical backplane assembly comprising:
   a) a backplane having a planar surface with an optical via formed therein and an optical trace disposed parallel with the planar surface connected to the optical via, the optical trace of the backplane having a first index of refraction;
   b) an angled element having a reflective surface disposed within the optical via and the angled element also having a distal end projecting from the optical via;
   c) a daughter board having a planar surface mounted perpendicular to the planar surface of the backplane, the daughter board having an optical trace disposed parallel to the planar surface of said daughter board, the optical trace of the daughter board being connected to the distal end of the angled element.

2. The optical backplane assembly of claim 1 wherein the diameter of the angled element is smaller than the diameter of the optical via and the backplane assembly further comprises a potting material disposed within the optical via around the angled element.

3. The optical backplane assembly of claim 2 wherein the potting material is a resin.

4. The optical backplane assembly of claim 3 wherein the resin has an index of refraction matched to the first index of refraction of the optical trace of the backplane.

5. The optical backplane assembly of claim 1 additionally comprising a light emitting material coupled to the optical via.

6. The optical backplane assembly of claim 5 wherein the light emitting material is a phosphorescent material.

7. The optical backplane assembly of claim 5 wherein the light emitting material is coupled to the optical via through a second optical trace branching off from the optical trace of the backplane.

8. The optical backplane assembly of claim 1 additionally comprises electrical signal traces in the daughter card and backplane and an electrical connector interconnecting the electrical signal traces in the daughter card and the backplane.

9. The optical backplane assembly of claim 1 wherein the optical signal trace is a waveguide.

10. The optical backplane assembly of claim 1 wherein the angled element is disposed at an angle of 45° relative to the optical signal trace in the backplane.

11. A method of manufacturing an optical backplane assembly comprising:
    a) providing a backplane having an optical via and an optical trace connected to the optical via;
    b) inserting a reflective element into the optical via and aligning the reflective element to the optical trace of the backplane;
    c) fixing the position of the reflective element;
    d) providing a daughter board having an optical trace and coupling the optical trace of the daughter board to the reflective element.

12. The method of claim 11 wherein the backplane includes a light emitting element coupled to the optical via and the step of aligning the reflective element includes illuminating the backplane to cause the light emitting element to emit light.

13. The method of claim 12 wherein the light emitting element comprises a phosphorescent material and the step of aligning the reflective element additionally includes measuring the intensity of the emitted light from the light emitting element to determine the center of the optical trace of the backplane.

14. The method of claim 11 wherein the step of fixing the position of the reflective element comprises applying an adhesive.

15. The method of claim 14 wherein the step of applying an adhesive comprises applying a resin and activating the resin to cure it.

16. The method of claim 15 wherein the resin is UV curable resin and the step of activating the resin comprises exposing the backplane to TV light.

17. The method of claim 11 wherein the step of aligning the reflective element includes inserting a directional sensor into the optical via and moving the directional sensor to determine the center of the optical trace.

* * * * *